(No Model.) 2 Sheets—Sheet 1.
G. H. HASEY.
BERRY PICKING MACHINE.
No. 546,777. Patented Sept. 24, 1895.
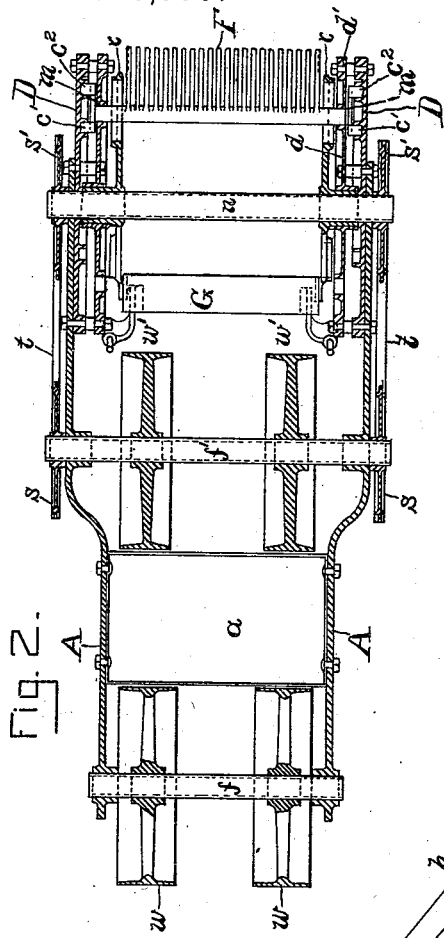
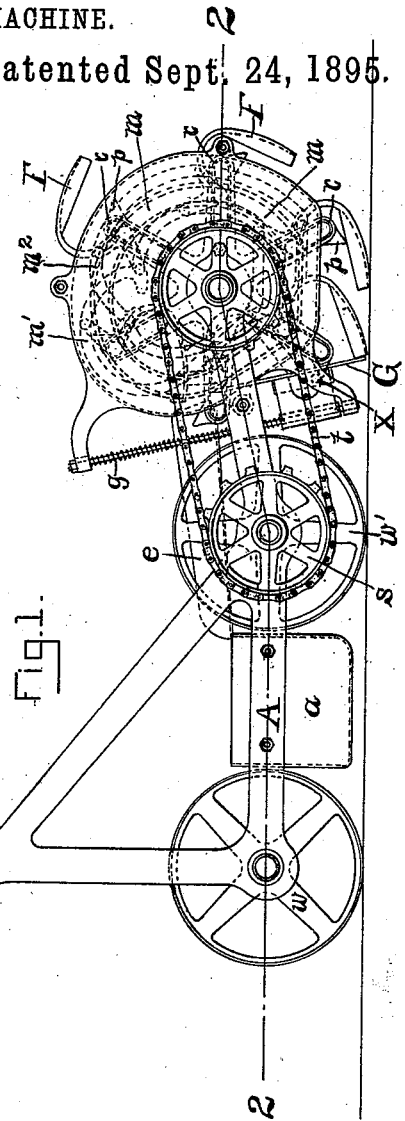
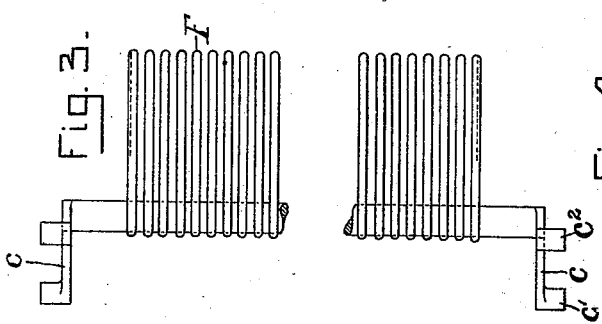
Witnesses.
John R Snow
J Mott Curley
Inventor
George H Hasey
by J K Maynadier
Atty.

(No Model.) 2 Sheets—Sheet 2.

G. H. HASEY.
BERRY PICKING MACHINE.

No. 546,777. Patented Sept. 24, 1895.

Witnesses.
John R. Snow
[signature]

Inventor.
George H. Hasey
by J. E. Maynadier
Atty.

UNITED STATES PATENT OFFICE.

GEORGE H. HASEY, OF TAUNTON, MASSACHUSETTS, ASSIGNOR TO ROBERT C. WOODWARD, OF SAME PLACE.

BERRY-PICKING MACHINE.

SPECIFICATION forming part of Letters Patent No. 546,777, dated September 24, 1895.

Application filed September 29, 1893. Serial No. 486,767. (No model.)

*To all whom it may concern:*

Be it known that I, GEORGE HENRY HASEY, a citizen of the United States, residing at Taunton, in the county of Bristol and State of Massachusetts, have invented a new and useful Machine for Picking Berries, of which the following is a specification.

Figure 5:
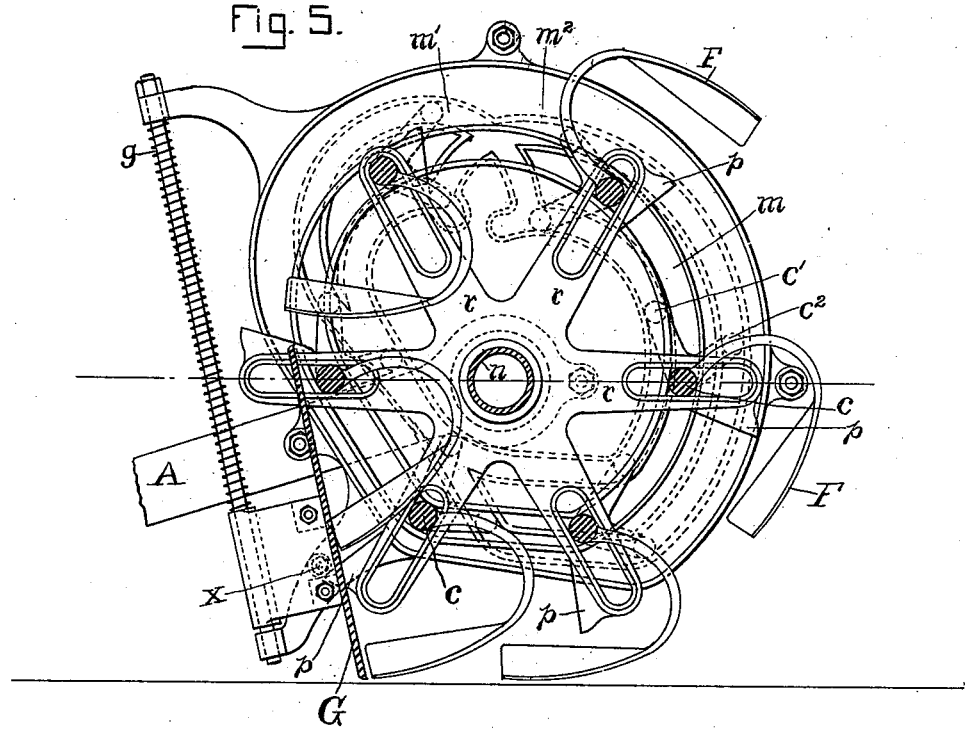
Figure 6:
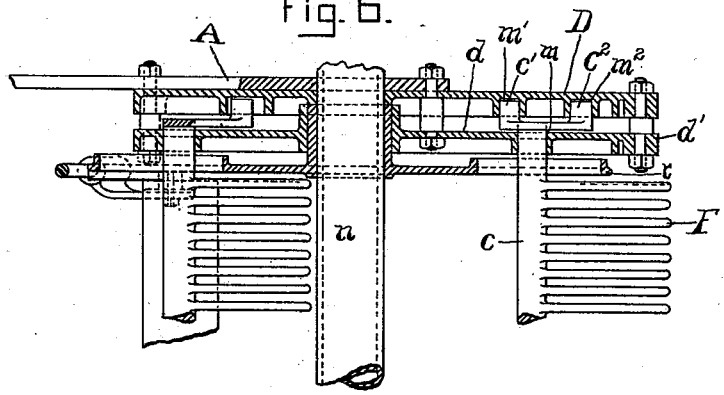

Figure 1 is an elevation, and Fig. 2 a section, on lines 2 2, Fig. 1, illustrating my machine. Figs. 3 and 4 are a plan and elevation of the picker-fingers and their carriers. Fig. 5 is a longitudinal section on a larger scale of the "picker" end of the machine. Fig. 6 is a section on the section-line shown in Fig. 5.

My machine, as shown, has a frame A to support the box $a$ for the berries and the mechanism connected with the picker-fingers F, their carriers $c$, and the gate G. This frame is mounted on wheels $w'$ $w'$ and provided with a handle $h$. The shaft $f'$ carries upon its ends sprocket-gears $s$, which by means of sprocket-chains $t$ actuate the sprocket-gears $s'$, fast to the shaft $n$, which carries slotted radial arms $r$. Cam-studs $c'$ $c^2$ upon the carriers $c$, traveling in the cams $m'$ $m^2$, regulate the motion and position of the fingers F as they are carried around by the revolution of the slotted radial arms $r$. The carriers $c$ pass through the slotted radial arms $r$ and travel in the main cam $m$. The gate G, after being raised by the wiper $p$, is returned to its position by the gate-springs $g$. The chute $e$ conveys the berries to the berry-box $a$.

D represents cam-plates for the cams $m'$ $m^2$, and $d$ $d'$, Fig. 2, the cam-plates forming cams $m$. The shaft $f$ carries wheels $w$, and shaft $f'$ carries wheels $w'$ and sprocket-wheels $s$. The radial arms $r$ carry at their extremities wipers $p$, which engage with stud $x$ to raise the gate G.

It will be obvious that the mechanical details may be varied widely, the main matter being to actuate the gate and the picker-fingers automatically, so that the fingers will enter the vines until their ends come close to the gate, when both act together to strip the berries from the vines.

The main feature of my machine is the picker-fingers and the gate co-operating with the fingers connected by mechanism for actuating and controlling the motion of the fingers and the gate, and these parts are so organized in that form of my machine shown in the drawings that the operator may push the machine over the bog much as a lawn-mower is propelled. I have shown two pairs of supporting wheels or rollers with one pair used as driving-wheels for the actuating mechanism; but it is obvious that the mechanism may be otherwise driven—as, for example, by a shaft and pulley revolved by hand—the fingers being inserted underneath the vines until their ends nearly reach the sliding gate. The fingers and gate move up together, thus stripping the berries from the vines. The berries thus stripped from the vines are held in a receptacle formed by the fingers and the gate, the outer fingers being formed with a rib to act as side pieces for this receptacle. The upward motion of the fingers and the gate is continued until the berries in the receptacle are stripped from the vines, when the gate moves back to meet the next set of fingers and the operation is repeated. The upward motion of the fingers discharges the berries over the top of the gate into the chute $e$, down which they fall into the box $a$. Motion is imparted to the carriers $c$, carrying the fingers F, by the radial slotted arms $r$, and three cam-grooves $m$ $m'$ $m^2$ guide and control the motion of the carriers and fingers. The cam-studs are in practice fitted with cam-rolls. (Not shown because of the small scale of the drawings.) The main cam $m$ determines the bodily motion of the fingers, while the two other cams $m'$ $m^2$ give the fingers their axial motions.

The operation of the machine is as follows: As the machine is moved over the bog the radial arms $r$ fastened to the shaft $n$ rotate, carrying the carriers $c$ and the picker-fingers F around with them. As the fingers move down point first they enter the vines. Their motion while entering the vines is in a direction opposite to that in which the machine is moving, and the simultaneous forward motion of the machine prevents any improper combing of the vines. As soon as the fingers get into proper relation with the gate to form a receptacle for the berries, the fingers and the gate move together upward, the gate being raised by the wipers $p$ upon the ends of the slotted arms $r$, the fingers stripping off the berries as they rise, and at the proper time the gate is released, the pin $x$ passing down over the inner end of wiper $p$, and is thrown down ready for the next operation, the release being effected by the stud $x$ being drawn off the wiper $p$ by the slant of the gate in rising. The berries in the receptacle formed by the gate and the fingers acting with it are carried up as the fingers move up until the ends of the fingers are high enough to allow the berries to roll over the gate into the chute $e$, down which they travel to the box $a$.

What I claim as my invention is—

1. The berry picking machine above described consisting of a carriage supporting the mechanism; a gate, mounted in guides on that carriage; those guides; picker fingers co-operating with the gate to strip the berries from the vines; their carriers; a shaft carrying the carriers; wipers upon the picker finger carriers to move the gate; mechanism for controlling the movement of the picker finger carriers; a receptacle to receive the berries, when released by the gate; and mechanism for connecting the carrier shaft with the carriage axle, the movement of the carriage actuating the machine; all the parts being organized and operating substantially as described.

2. In a berry picking machine the combination of picker fingers; picker finger carriers; cams; and radial slotted arms the radial slotted arms controlling the bodily and the cams the axial movement of the picker fingers, all organized and operating substantially as described.

3. In a berry picking machine a series of picker fingers; carriers by which the fingers are carried bodily about a single axis; cams by which each set of fingers is given an axial movement; and a plate with which each set of fingers engages, one set after the other, to form a temporary receptacle for the berries as they are stripped from the vines; all substantially as described.

GEO. H. HASEY.

Witnesses:
J. E. MAYNADIER,
E. U. MAYNADIER.